United States Patent [19]
Piro

[11] Patent Number: 5,860,293
[45] Date of Patent: Jan. 19, 1999

[54] AIR COOLING APPARATUS INCLUDING FAN AND COOLING PACK

[76] Inventor: Mathew P. Piro, 631 N. Santa Cruze Ave., Los Gatos, Calif. 95030

[21] Appl. No.: 874,466

[22] Filed: Jun. 16, 1997

[51] Int. Cl.$^6$ .................................................. F25D 3/02
[52] U.S. Cl. .............................. 62/420; 62/425; 62/530
[58] Field of Search .............................. 62/426, 530, 420, 62/425

[56] References Cited

U.S. PATENT DOCUMENTS

| | | | |
|---|---|---|---|
| 662,541 | 11/1900 | Miskolczy | 62/406 |
| 1,874,843 | 8/1932 | Adler et al. | 62/426 |
| 2,134,881 | 11/1938 | Mitchell | 62/426 |
| 2,166,401 | 7/1939 | Frank | 62/426 |
| 2,289,483 | 7/1942 | Carson | 62/426 |
| 2,300,358 | 10/1942 | Hans | 62/426 |
| 2,557,004 | 6/1951 | Lepper | 62/426 |
| 2,749,725 | 6/1956 | Essman et al. | 62/426 |
| 2,841,964 | 7/1958 | Anderson | 62/426 |
| 4,612,774 | 9/1986 | Budreau | 62/59 |
| 4,751,827 | 6/1988 | Villarreal | 62/406 |
| 4,854,374 | 8/1989 | Harrison | 165/47 |
| 4,860,556 | 8/1989 | Hammett | 42/406 |
| 4,879,880 | 11/1989 | Harrison | 62/406 |

FOREIGN PATENT DOCUMENTS 224242  12/1983  Japan ....................... 62/406

*Primary Examiner*—William Doerrler
*Attorney, Agent, or Firm*—Hugh P. Gortler

[57] ABSTRACT

A cooling pack includes a plurality of thermally conductive shells made of a rigid plastic. Each shell contains a coolant and is securable directly to the protective housing of an electric fan. The shells are sized and shaped to allow the passage of fan air while the fan is operating. Heat is removed from the fan air flowing past the shells, thereby improving the cooling capability of the fan.

18 Claims, 3 Drawing Sheets

AIR COOLING APPARATUS INCLUDING FAN AND COOLING PACK

BACKGROUND OF THE INVENTION

The invention relates to apparatus for cooling air. Such apparatus includes air conditioners, evaporative coolers and electric fans. Air conditioners and evaporative coolers are generally expensive to purchase and operate. They are also bulky and, therefore, not very portable. Electric fans, while portable and less expensive, do not have the capability to cool air as well as air conditioners and evaporative coolers.

Cooling capability of an electric fan can be improved by placing a block of ice in front of the fan. The ice removes heat from the fan air. However, the ice causes problems, especially when it melts. Cooling capability of a fan appears to be improved by apparatus disclosed in Hammett U.S. Pat. No. 4,860,556. A plastic container of "freezable" liquid is suspended several inches in front of a fan by a rigid frame. The container has a "multitude" of channels for allowing fan air to pass through the container. Heat is removed from the fan air passing through the channels. However, Hammett's apparatus appears to have problems. The rigid frame and container add to the overall bulk of the fan and, therefore, reduce the stability of the fan. When the container is filled with water, it tends to tip the fan over. The frame and container also add to the size of the fan and, therefore reduce the portability of the fan. Additionally, the container does not provide a continuous cooling effect. After the liquid has absorbed heat for a while, the container must be detached from the fan and the liquid must be re-frozen. Once the container is detached, the cooling capability of Hammett's apparatus drops to that of an ordinary fan.

SUMMARY OF THE INVENTION

These problems are overcome by the present invention. The invention can be regarded as a cooling pack for a fan. The cooling pack comprises a number n of thermally conductive shells made of a coolant-impregnable material, where n is an integer greater than zero; and means for removably securing each shell directly to the fan. Each shell has a size that allows passage of a substantial amount of fan air past the shell while the shell is secured directly to the fan and the fan is operating.

The invention can also be regarded as an apparatus comprising a fan having a perimeter; a plurality of thermally conductive, coolant impregnable, rigid plastic shells; and means for securing each of the shells directly to the fan. Each shell has at least one passageway for fan air to flow therethrough, and the plurality of shells can be arranged within the perimeter of the fan.

DETAILED DESCRIPTION OF THE INVENTION

Figure 1A:
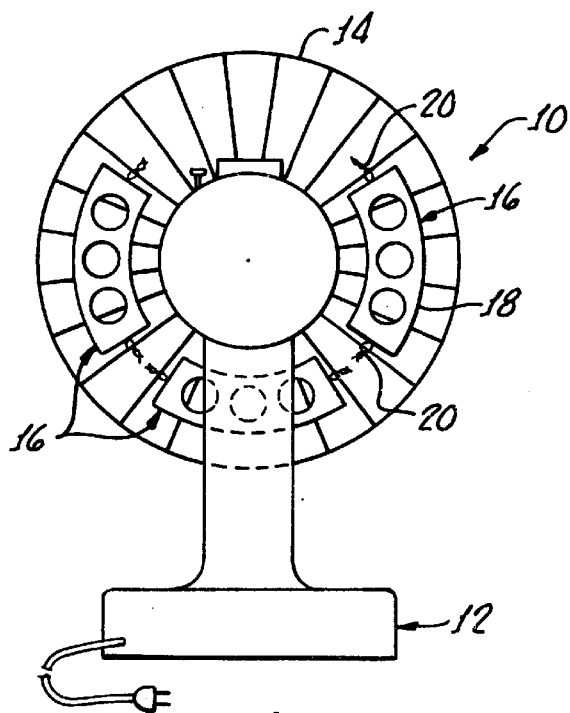
FIGS. 1a and 1b show an apparatus according to the present invention.
Figure 1B:
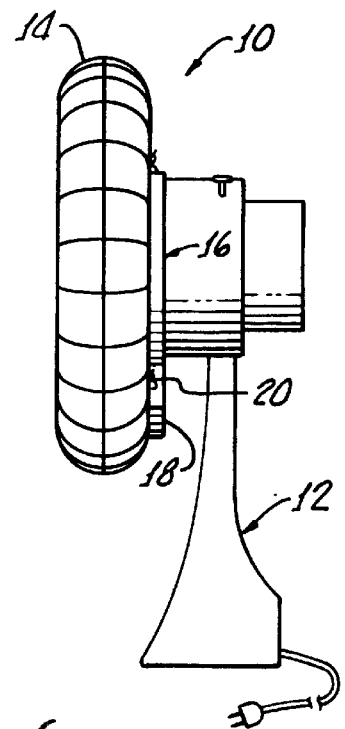

FIG. 1 shows a cooling apparatus 10 including a standard oscillating fan 12 having fan blades and a protective housing 14 for the fan blades. The cooling apparatus 10 further includes a cooling pack 16 secured to the protective housing 14 of the fan 12. The cooling pack 16 includes a plurality of thermally conductive shells 18 and twist ties 20 for removably securing each shell 18 directly to the protective housing 14 of the fan 12. Each shell 18 has a size that allows passage of a substantial amount of fan air past the shell 18 while the shell 18 is secured directly to the fan 12 and the fan 12 is operating. The shells 18 can be secured to the suction side of the fan 12, the exhaust side of the fan 12, or anywhere else on the fan 12.

The shells 18 are filled with a non-toxic coolant which absorbs heat from the fan air. The coolant can be water or a liquid having a freezing point depressant such as the gel used in commercially available gel packs. During manufacture, each shell 18 is prefilled with the coolant and permanently sealed.

The shell 18 is made of a rigid plastic that is impregnable to the coolant. The plastic shell 18 must be tough and durable to endure constant cycles of cooling and thawing. However, the shell 18 must have a wall thickness that allows rapid heat transfer to the coolant. Different sizes of shells 18 could be selected to accommodate fans 12 of different sizes (e.g., ten inch oscillating fans, twenty inch floor fans). Or, a single size could be selected to fit fans 12 of all sizes. An ideal shell size would allow all of the shells 18 to be arranged within the perimeter of the fan's protective housing 14 simultaneously. FIG. 1 shows all of the shells 18 arranged in a circle along the perimeter of the protective housing 14.

As an alternative to the rigid plastic shells, the coolant and the shells can be formed from gel-packs. Each gel pack is shaped to define passageways that allow for the passage of fan air, and has a wall thickness allowing for rapid heat transfer from the fan air to the gel within.

To secure the shells 18 to the fan, the twist ties 20 are wrapped around the wires of the fan's protective housing 14.

The cooling pack can be used as follows. The shells 18 are placed in a freezer for a sufficient amount of time to allow the coolant to freeze. One, some or all of the shells 18 are removed from the freezer and secured to the protective housing 14 of the fan 12. For example, a single shell 18 could be secured to the rear of the protective housing 14; or three shells 18 could be secured to the rear of the protective housing 14; or two shells 18 could be secured to the protective housing 14, with one of the shells 18 being secured to the rear of the protective housing 14 and the other of the shells 18 being secured to the front of the protective housing 14 as a counterbalance. If a shell 18 is placed over the fan's motor, care must be taken to prevent any condensation from dropping onto the fan 12.

As the fan 12 is turned on and begins to draw air through the rear of the protective housing 14, fan air is pulled through and around the shells 18. Heat is transferred from the air to the coolant, creating a cooling effect as the air blows from the front of the fan 12.

After a while, the coolant in the shells 18 will absorb an excessive amount of heat. Therefore, the shells 18 must be removed periodically removed from the fan 12 and placed back into the freezer. After the coolant in a shell 18 is re-frozen, that shell 18 can be re-secured to the fan 12.

Shells 18 can be rotated in and out of the freezer in order for the fan 12 to maintain a relatively constant cooling effect. Moreover, the amount of cooling can be adjusted by varying the number of shells 18 secured to the fan 12.

Figure 2:
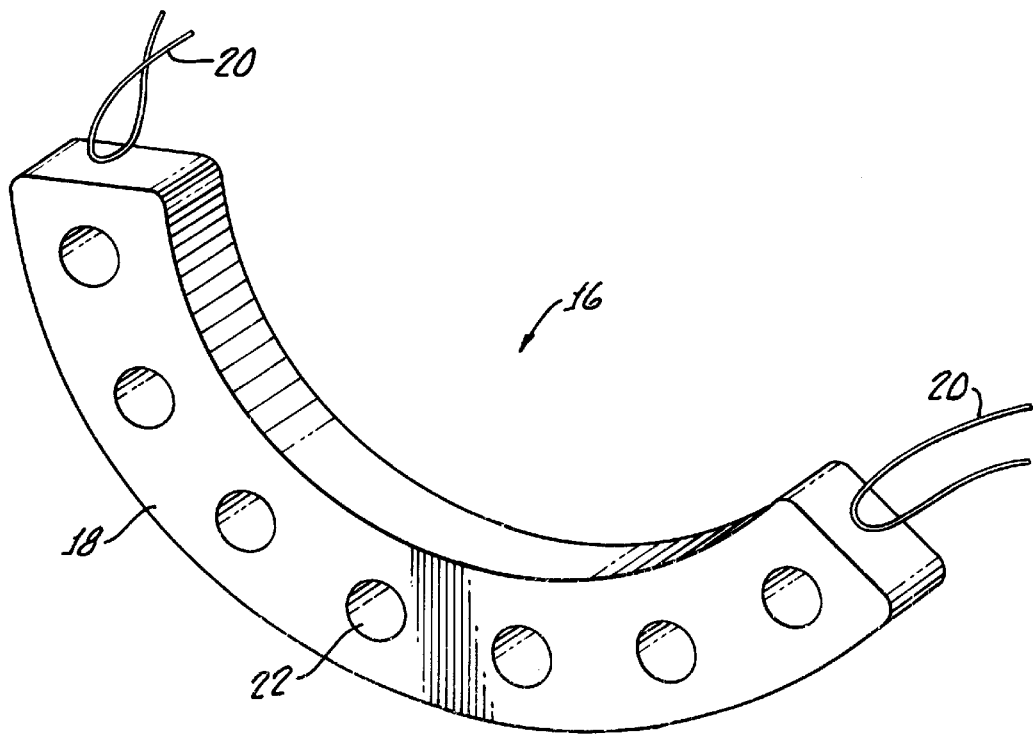
FIG. 2 shows a cooling pack shell which forms a part of the apparatus of FIG. 1, the shell being shown in greater detail.

FIG. 2 shows a shell 18 of a cooling pack 16 in greater detail. The shell 18 has a front surface and a back surface and a plurality of passageways 22 extending from the front surface to the back surface. The passageways 22 increase the surface area of the shell 18 and, therefore, increase the amount of heat removed from the fan air. However, the passageways 22 are not required.

The twist ties 20 are hot-glued or integrally formed with the shell 16. The twist ties 20 can include a thin-gauge wire normally used in conventional twist ties. The wires can be coated with a substance that readily adheres to the shell 18.

Figure 3:
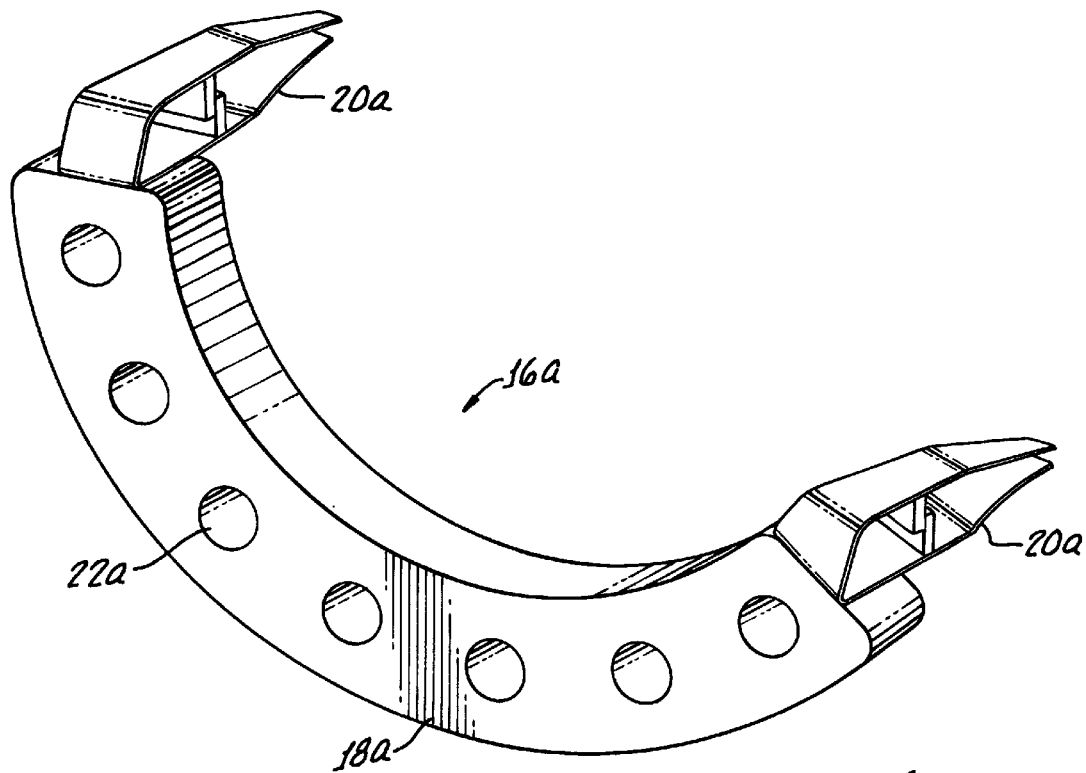
FIGS. 3 and 4 show alternative embodiments of the cooling pack shell.

Although twist ties 20 are shown as the means for attaching the shell 18 to the fan 12, other means can be used. FIG. 3 shows clips 20a for securing the shell 18 directly to the fan 12. The clips 20a can be overgrown clothes line hanger clips or plastic clips, or they can be spring-loaded metal clips. The clips 20a can extend through some of the air passageways 22a in the shell 18a and attach to the wire of the front or rear of the fan's protective housing 14, or the clips 20a can be hot-glued to, or formed integrally with, the shell 18a.

Figure 4:
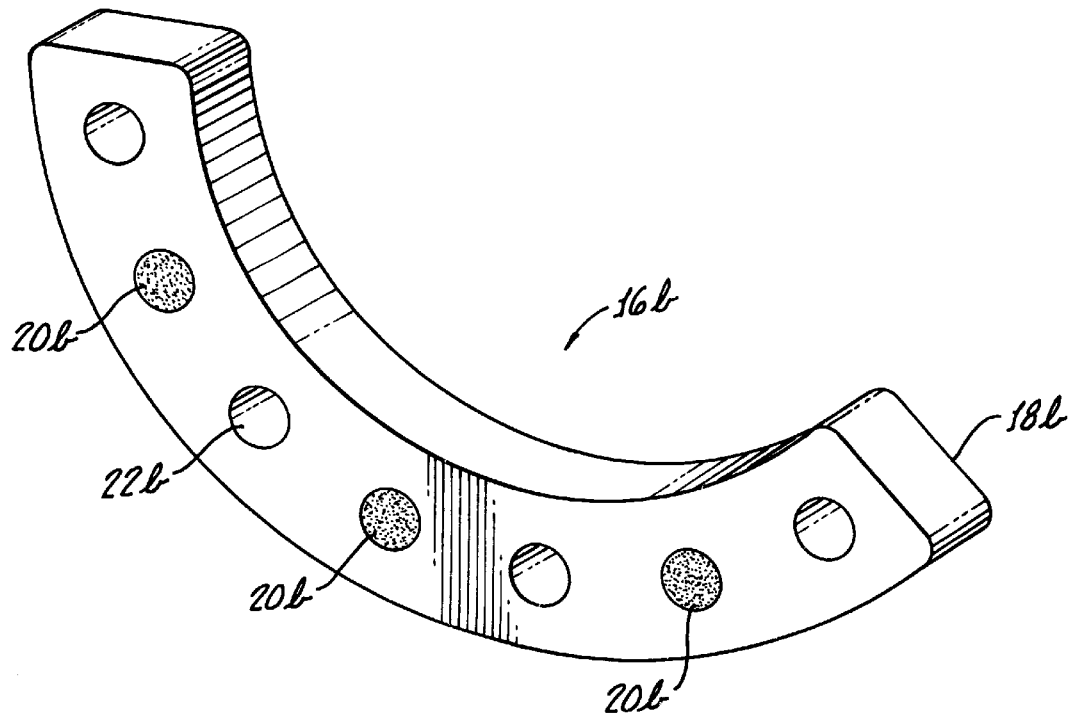

FIG. 4 shows small ceramic magnets 20b for securing the shell 18b directly to the fan 12. The magnets 20b can be embedded in the plastic wall of the shell 18b, or they can be attached to an inner surface of the shell's wall. The magnets 20b work best for a shell 18b that must be secured to a flat, metal surface.

The invention is not limited to twist ties, clips or magnets for securing the shells to the fan. For example, hook and loop material such as the type sold under the trademark "VELCRO" could be used. Or, metal hooks could be used to secure the shells to the fan.

Figure 5:
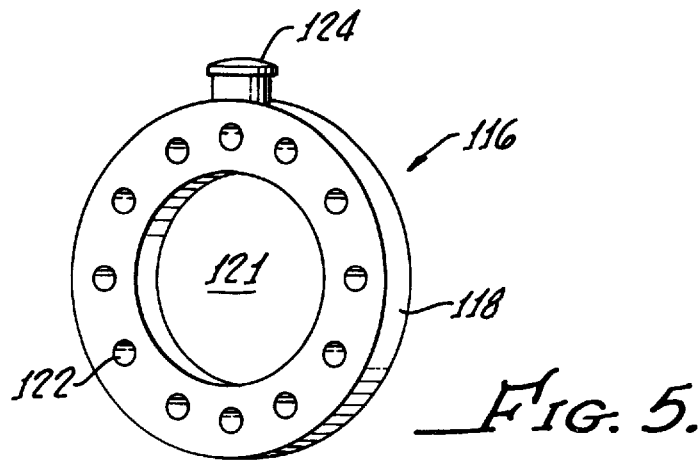
FIG. 5 shows an alternative embodiment of a cooling pack according to the present invention.

FIG. 5 shows a cooling pack 116 including only a single shell 118. The shell 118 has a front surface and a back surface and a central passageway 121 extending from the front surface to the back surface. The shell 118 also has a plurality of additional passageways 122 extending between the front surface and the back surface. Each of the additional passageways 122 is substantially smaller than the central passageway 121.

The cooling pack 116 also includes a spout 124 for adding coolant to the shell 118 and removing coolant from the shell 118. Additionally, the cooling pack 116 can include an absorbent wrap surrounding the shell 118. The wrap could catch any dew or moisture that might drop off the shell 118. Portions of the wrap can be cut out in order to expose the passageways 121 and 122, or the wrap can be form-fitted to the shell 118, whereby the entire surface of the shell 118 (including the walls of the passageways 121 and 122) would be covered.

Thus disclosed is an apparatus including a fan and a cooling pack for increasing the cooling capability of the fan. The cooling pack is secured directly to the fan, resulting in an apparatus that offers small size, light weight and excellent stability. Installation of the cooling pack is flexible, since the shells can be attached anywhere on the fan. The flexibility of installation also enhances the stability of the fan, since the shells can be balanced on the fan, and shells can be added to the fan until the fan becomes unbalanced. Cooling capacity is adjustable since one, some or all of the shells can be secured to the fan. A constant cooling effect can be maintained, since the shells can be rotated between the fan and the freezer.

Figure 6:
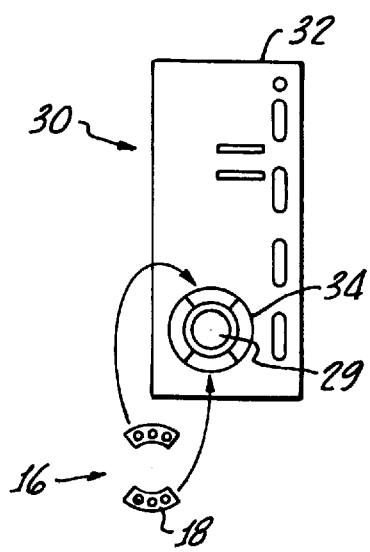
FIGS. 6 to 8 show different applications for the apparatus according to the present invention.
Figure 7:
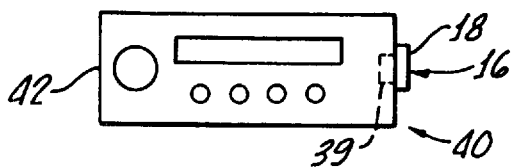

Use of the cooling pack is not limited to oscillating fans; the cooling pack can be adapted for use with fans of different sizes and types. Moreover, such adaptability allows the apparatus to do more than simply cool a section of a room. FIG. 6 shows a fan 29 attached to the housing 32 of computer 30, and FIG. 7 shows a fan 39 attached to the housing 42 of a stereo 40. Each housing 32 and 42 includes a wall having an air vent 34 (the air vent on the stereo 30 is not shown). The fan 29 or 39 is mounted to an interior surface of the wall, and each shell 18 is securable directly to an exterior surface of the housing 32 or 42 at the air vent 34. Air being drawn into the housing 32 or 42 is cooled by the shells 18. The shells 18 are most readily attached to the housing 32 or 42 by the small ceramic magnets.

Figure 8:
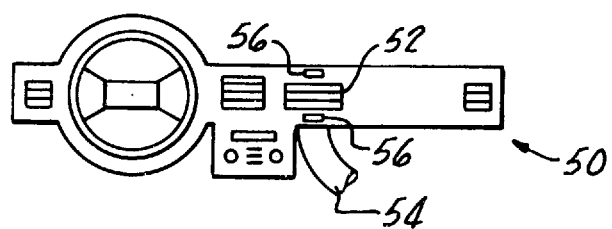

FIG. 8 shows that the shells 18 can be attached above the grill 52 on the dashboard 50 of an automobile. As is conventional in automobiles, a fan blows air into the passenger compartment via an air duct 54. One end of the air duct 54 terminates in the grill 52. Each shell 18 is securable directly above the grill 52 by a hook and loop material 56. The shells 18 allow cool air to be supplied to an automobile not having an air conditioner or, for an automobile having an air conditioner, the shells 18 allow cool air to be supplied while the air conditioning system is starting up.

It is understood that additional changes and modifications may be made without departing from the spirit and scope of the invention. Accordingly, the invention is not limited to the precise embodiments described hereinabove. Instead, it is defined by the claims that follow.

I claim:

1. A cooling pack for a fan, the fan having a protective housing, the cooling pack comprising:

a number n of thermally conductive shells made of a coolant-impregnable material, where n is an integer greater than one; and means for removably securing each shell directly to an outer surface of the protective housing of the fan;

each shell having a size that allows passage of a substantial amount of fan air past the shell while the shell is secured directly to the fan and the fan is operating; wherein at least two of the shells can be secured simultaneously to the protective housing.

2. The cooling pack of claim 1, wherein the fan has a perimeter, and wherein the plurality of shells can be arranged within the perimeter of the fan.

3. The cooling pack of claim 1, wherein each shell has a front surface and a back surface and at least one passageway extending from the front surface to the back surface.

4. The cooling pack of claim 3, wherein the shell also has a plurality of additional passageways extending between the front surface and the back surface, each of the additional passageways being substantially smaller than the central passageway.

5. The cooling pack of claim 1, wherein each shell is made of a rigid plastic.

6. The cooling pack of claim 1, wherein each shell further includes means for adding and removing coolant.

7. The cooling pack of claim 1, further comprising coolant, wherein each shell is pre-filled with the coolant and sealed.

8. The cooling pack of claim 7, wherein the coolant and the shells are packaged as gel-packs.

9. The cooling pack of claim 1, wherein the securing means includes twist ties.

10. The cooling pack of claim 1, wherein the securing means includes clips.

11. The cooling pack of claim 1, wherein the securing means includes at least one magnet embedded in each shell.

12. A cooling pack for an electric fan, the fan having a protective housing, the cooling pack comprising:

a plurality of thermally conductive, coolant impregnable, rigid plastic shells, each shell having at least one passageway for fan air to flow therethrough, and twist ties for removably securing each of the shells directly to the protective housing of the fan;

the shells and their passageways being sized to allow passage of a substantial amount of fan air past the shells when the shells are secured to the protective housing and the fan is operating.

13. The cooling pack of claim 12, further comprising coolant, wherein each shell is pre-filled with coolant and sealed.

14. The cooling pack of claim 12, wherein at least one twist tie is affixed to each shell.

15. Apparatus comprising:

a fan;

a grille in front of the fan;

a plurality of thermally conductive, coolant impregnable, rigid plastic shells, each shell having at least one passageway for fan air to flow therethrough; and means for securing each of the shells directly to the grille, wherein the plurality of shells can be secured simultaneously to the grille, the securing means being selected from the group consisting of twist ties and magnets.

16. The apparatus of claim 15, wherein the fan is an oscillating fan including at least one fan blade and a protective housing for the at least one fan blade, the protective housing including the grille, and wherein each shell is securable directly to the protective housing.

17. The apparatus of claim 15, further comprising a housing including a wall having an air vent; the grille covering the air vent, wherein the fan is operable to circulate air through the housing, the fan being mounted to an interior surface of the wall; and wherein each shell is securable directly to an exterior surface of the grille.

18. The apparatus of claim 15, further comprising an air duct for a vehicle, the fan being operable to circulate air through the air duct, one end of the air duct terminating in the grille, wherein each shell is securable directly about the grille.

* * * * *